(12) United States Patent
Christianson et al.

(10) Patent No.: US 8,291,605 B2
(45) Date of Patent: *Oct. 23, 2012

(54) BOX LEVEL

(75) Inventors: John Christianson, Waukesha, WI (US); Charles D. Kim, Raleigh, NC (US)

(73) Assignee: Empire Level Mfg. Corp., Mukwonago, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/913,111

(22) Filed: Oct. 27, 2010

(65) Prior Publication Data
US 2011/0099824 A1    May 5, 2011

Related U.S. Application Data

(60) Provisional application No. 61/256,264, filed on Oct. 29, 2009, provisional application No. 61/259,038, filed on Nov. 6, 2009.

(51) Int. Cl.
*G01C 9/26* (2006.01)
*B43L 7/00* (2006.01)
(52) U.S. Cl. .............. 33/379; 33/381; 33/451
(58) Field of Classification Search .......... 33/379, 33/365, 377, 381, 382, 451
See application file for complete search history.

(56) References Cited

U.S. PATENT DOCUMENTS

| | | | |
|---|---|---|---|
| 1,029,744 A | 6/1912 | Desilets | |
| 1,033,742 A | 7/1912 | Skates | |
| 2,133,598 A * | 10/1938 | Torbert, Jr. | 359/439 |
| 2,198,945 A | 4/1940 | Morris | |
| 2,750,678 A | 6/1956 | Ziemann | |
| 2,944,144 A | 7/1960 | Naylor | |
| 3,311,990 A * | 4/1967 | Wright | 33/381 |
| 4,208,803 A | 6/1980 | Brown et al. | |
| 4,407,075 A | 10/1983 | MacDermott et al. | |
| 4,503,623 A | 3/1985 | Gould, Jr. | |
| D301,553 S | 6/1989 | Makofsky et al. | |
| 4,928,395 A | 5/1990 | Good | |
| 5,033,199 A * | 7/1991 | Wilcox et al. | 33/379 |
| 5,134,780 A | 8/1992 | Butler et al. | |
| 5,406,714 A | 4/1995 | Baker et al. | |
| 5,438,761 A | 8/1995 | Krumszyn et al. | |
| 5,940,978 A * | 8/1999 | Wright et al. | 33/381 |
| 6,675,490 B1 | 1/2004 | Krehel et al. | |
| 6,760,975 B1 * | 7/2004 | Schmidt | 33/382 |
| 6,792,686 B2 | 9/2004 | Krehel et al. | |
| 7,089,676 B2 * | 8/2006 | Godinez | 33/371 |
| 7,204,029 B2 * | 4/2007 | Tran et al. | 33/451 |
| 7,409,772 B1 * | 8/2008 | Morrissey | 33/451 |
| 7,513,056 B1 | 4/2009 | Hobden et al. | |
| 7,765,706 B2 * | 8/2010 | Scheyer | 33/379 |
| 7,832,112 B2 * | 11/2010 | Christianson | 33/365 |
| 2006/0143933 A1 * | 7/2006 | Kallabis et al. | 33/451 |
| 2007/0144020 A1 | 6/2007 | Schmidt et al. | |
| 2009/0071023 A1 * | 3/2009 | Maruyama | 33/374 |

* cited by examiner

*Primary Examiner* — Christopher Fulton
(74) *Attorney, Agent, or Firm* — Jansson Shupe & Munger Ltd.

(57) ABSTRACT

A level including an elongate hollow frame with two sidewalls and a topwall extending therebetween. A central vial is within a topnotch formed by removal of a topwall section and adjacent sections of sidewalls including notch-defining bottom and side edges. An integral inner vertical wall extends between the top and bottom walls thereby reinforcing the frame along the frame length. The inventive level further preferably includes an external brace reinforcing a central frame portion weakened by forming the topnotch. The external brace includes first and second plate members each against one of the sidewalls about the notch-defining bottom and side edges and each substantially spanning a respective one of the sidewalls. A fastening member extending through the sidewalls and pulling the plate members toward each other to sandwich the sidewalls therebetween, thereby reinforcing a central frame portion weakened by forming the topnotch.

9 Claims, 17 Drawing Sheets

| NAME | LOAD APPLIED (lb) | MAX. DEFLECTION (in) | STRENGTH FACTOR USING 6061 | % STRONGER |
|---|---|---|---|---|
| STABILA | 275 | 0.237 | 0.5 | 100% |
| DEWALT-REV9 | 275 | 0.172 | 0.9 | 180% |

| NAME | LOAD APPLIED (lb) | MAX. DEFLECTION (in) | STRENGTH FACTOR USING 6061 | % STRONGER |
|---|---|---|---|---|
| STABILA | 275 | 0.237 | 0.5 | 100% |
| DEWALT-REV9 | 275 | 0.172 | 0.9 | 180% |
| DEWALT-REV9 (WITH BRACE) | 275 | 0.172 | 1.5 | 300% |
FIG. 18
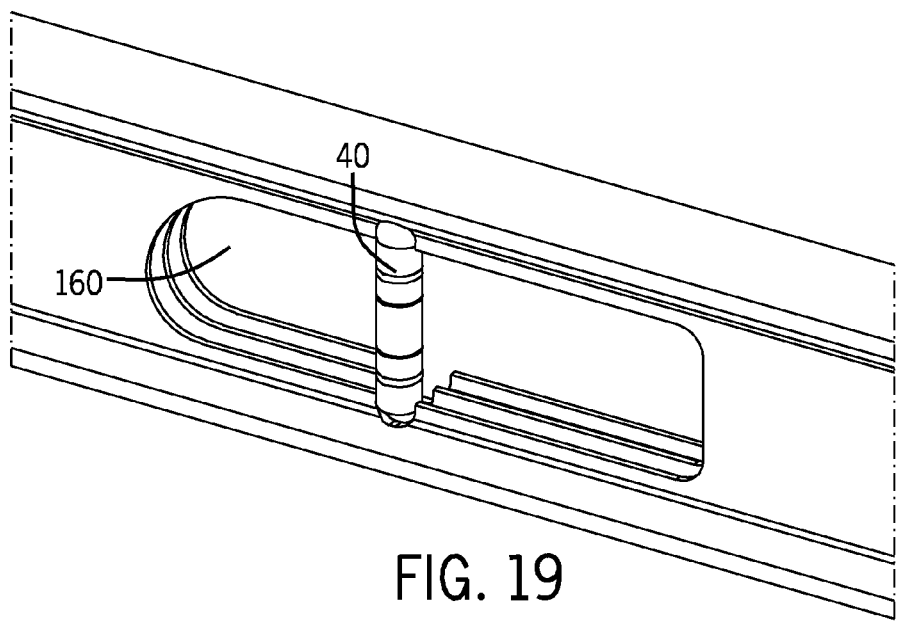
FIG. 19
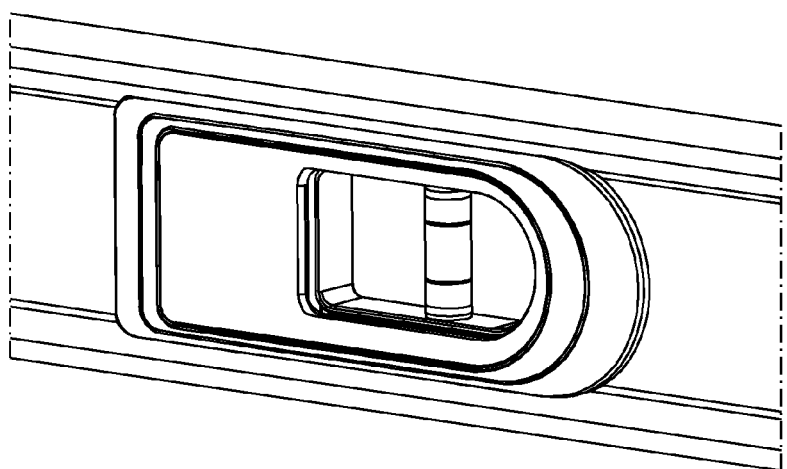
FIG. 20

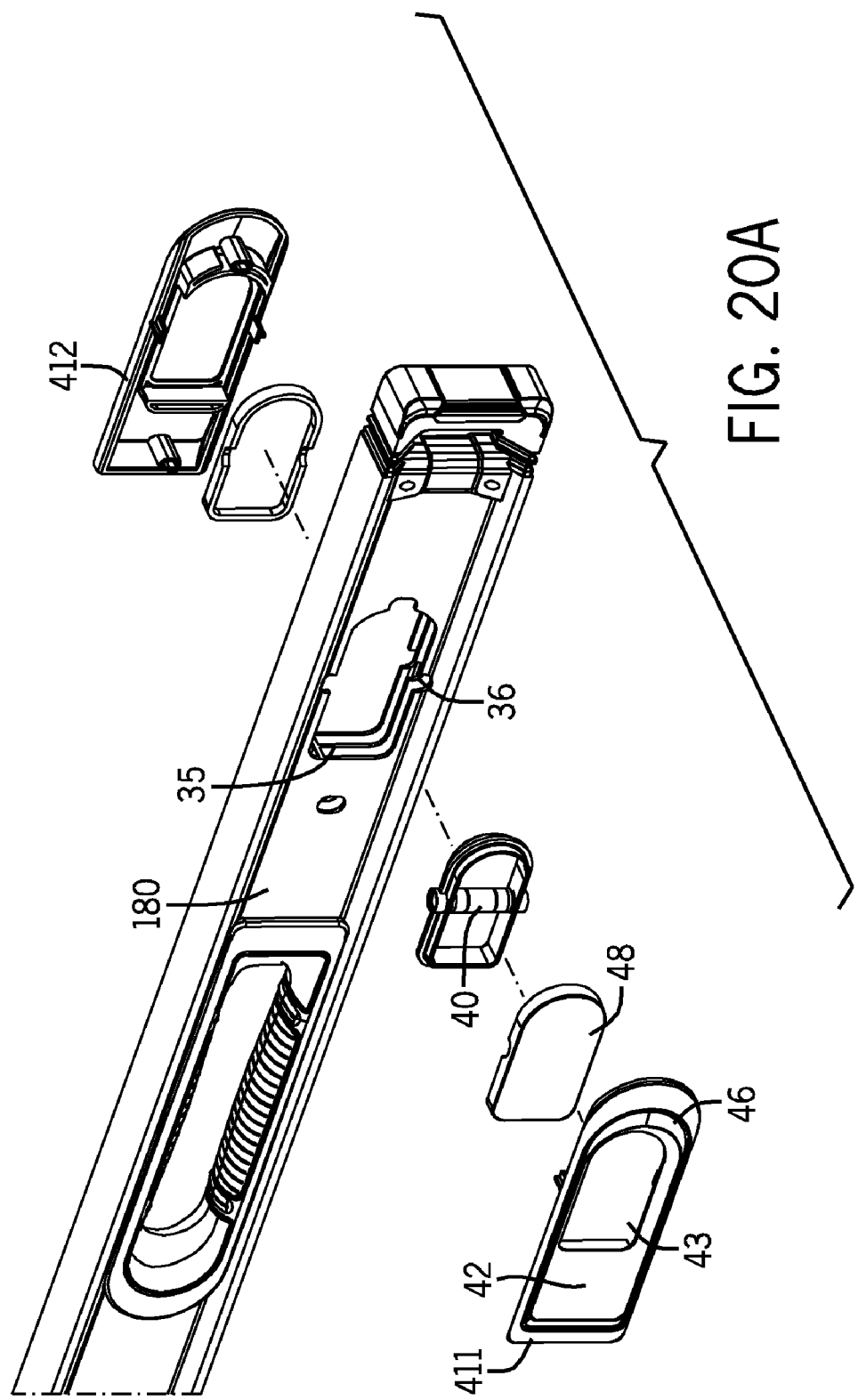

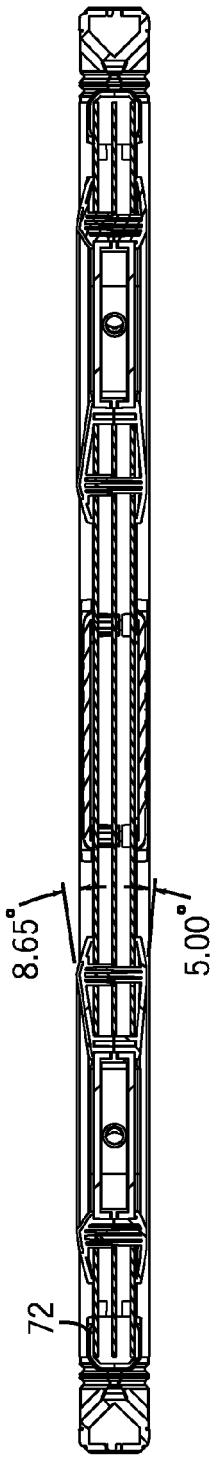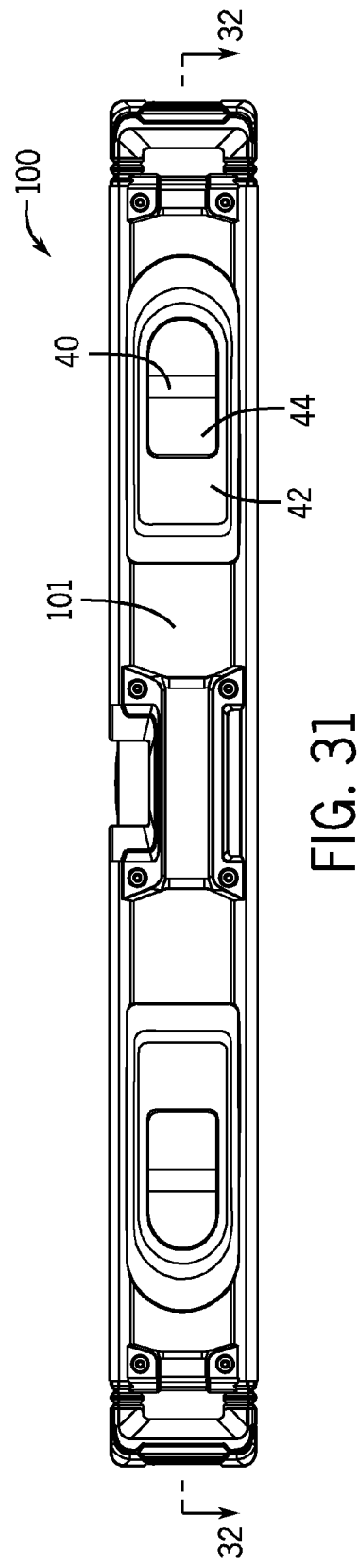

BOX LEVEL

RELATED APPLICATION

This application is based in part on U.S. Provisional Application No. 61/256,264, filed Oct. 29, 2009, the contents of which are incorporated herein by reference, and on U.S. Provisional Application No. 61/259,038, filed Nov. 6, 2009, the contents of which are incorporated herein by reference.

FIELD OF THE INVENTION

This invention relates to levels and, more particularly, to structures for reinforcement of the level frame.

BACKGROUND OF THE INVENTION

In heavy-duty levels it is important that the frame of the level maintains stability for accurate measurement readings. It is also important that levels, which are used in professional construction on types of jobs when a level may be dropped from a substantial height and be subjected to various stresses, sustain the impact with minimal or no damage.

Many box levels have a central vial positioned into a notch which is formed by removing a section of a top wall and adjacent portions of each side wall, as seen in FIG. 1.

Because material is removed from the center of the extruded frame, a central frame section becomes the weakest portion of the extrusion. Tests have shown that in prior levels 10, the central region 11 of a frame 12 with the cut-out notch portion 20 for the central vial is substantially weak. FIG. 2 shows that in such prior levels 10 a bottom 21 of the notch 20 is the weakest region. Portions 22 of sidewalls 13 which surround the central-vial notch 20 are also substantially weak regions 22A which extend to weakened areas 22B.

It is further seen in FIG. 2 that there is also a substantial weakness in top-wall regions 23 adjacent to hand holes from which material is also removed from the level frame 12. There is a need for an improved level with a strong stable frame.

OBJECTS OF THE INVENTION

It is an object of the invention to provide an improved level which overcomes some of the problems and shortcomings of the prior art, including those referred to above.

Another object of this invention is to provide a level with a strong stable frame even in areas of material removal.

Another object of the invention is to provide a level with a reinforcement of the central region of the level frame.

How these and other objects are accomplished will become apparent from the following descriptions and the drawings.

SUMMARY OF THE INVENTION

This invention, which will be described in detail below, is an improvement in levels of the type including an elongate hollow frame with two sidewalls and top and bottom walls which extend between the sidewalls and define top and bottom measuring surfaces. A topnotch is formed by removal of a topwall section and adjacent sections of sidewalls including notch-defining bottom and side edges. A central vial is within the topnotch.

The inventive level includes an external brace which has first and second plate members each against one of the sidewalls about the notch-defining bottom and side edges and each substantially spanning a respective one of the sidewalls.

It is preferred that a fastening member extends through the sidewalls and pulls the plate members toward each other to sandwich the sidewalls therebetween, thereby reinforcing a central frame portion weakened by forming the topnotch. The fastening member secures the plate members through the sidewalls with threaded fasteners extending through apertures in the first plate member and engaging aligned threaded channels protruding inwardly from the second plate member.

Each sidewall includes top and bottom outmost wall-portions joined with a recessed major wall-portion by top and bottom inclined wall-portions. The external brace preferably includes top and bottom ends each positioned against a respective one of the inclined wall-portions such that the brace is substantially recessed with respect to the outmost wall-portions.

It is preferred that the fastening member secure the plate members through the sidewalls with threaded fasteners extending through apertures in the first plate member and engaging aligned threaded channels protruding inwardly from the second plate member.

The hollow frame is preferably an extrusion including an inner horizontal wall extending between the sidewalls at the notch-defining bottom edges thereby reinforcing the frame weakened by the removal of the topwall section. The extrusion further preferably includes an integral inner vertical wall extending between the top and bottom walls thereby reinforcing the frame along the frame length.

Another aspect of this invention is a method for manufacturing a reinforced level including (a) an elongate hollow frame with two sidewalls and top and bottom walls each between the sidewalls and (b) a central-vial receiving topnotch formed by removal of a topwall section and adjacent sections of sidewalls including notch-defining bottom and side edges. The method includes the steps of providing an external brace including a pair of plate members each configured to substantially span one of the sidewalls about the notch-defining edges; positioning each plate member against a respective one of the sidewalls about the notch-defining edges; and securing the external brace to the frame with a fastening member extending through the sidewalls and pulling the plate members toward each other to sandwich the sidewalls therebetween, thereby reinforcing a central frame portion weakened by the topnotch.

BRIEF DESCRIPTION OF THE DRAWINGS

FIG. 18 is a comparison table reflecting test results for increase in frame strengthening in the inventive level frame of FIG. 5 compared to the inventive level frame of FIG. 17 and to a prior art level.

FIG. 19 is a fragmentary perspective view of the end-vial region of the inventive level, and showing calibration-free installation of the end vial.

FIG. 20 is a fragmentary perspective view of the end-vial region of the inventive level showing an improved-visibility plumb vial.

FIG. 20A is an exploded view of the end-vial structure of the inventive level of FIG. 20.

FIG. 31 is a front elevation of the inventive level.

FIG. 32 is a cross-section of the inventive level taken along a horizontal plane.

DETAILED DESCRIPTION OF PREFERRED EMBODIMENTS

Figure 1:
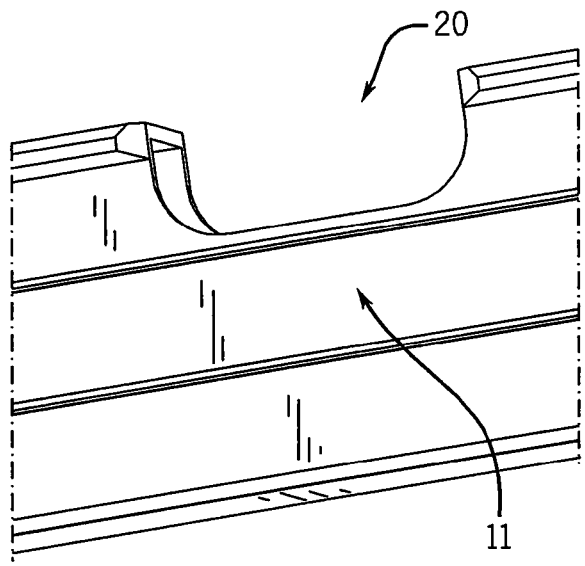
FIG. 1 is a fragmentary perspective view of a prior level showing a top-notch material removal.

FIGS. 3-5, 7-17 and 19-32 illustrate an inventive level 100 which includes an elongate hollow frame 120 with two sidewalls 180, a top wall 130 and a bottom wall 140 which extend between sidewalls 180 and define top and bottom measuring surfaces. A topnotch 20 is formed by removal of a topwall section and adjacent sections of sidewalls including notch-defining bottom and side edges. A central vial 50 is within topnotch 20.

Figure 3:
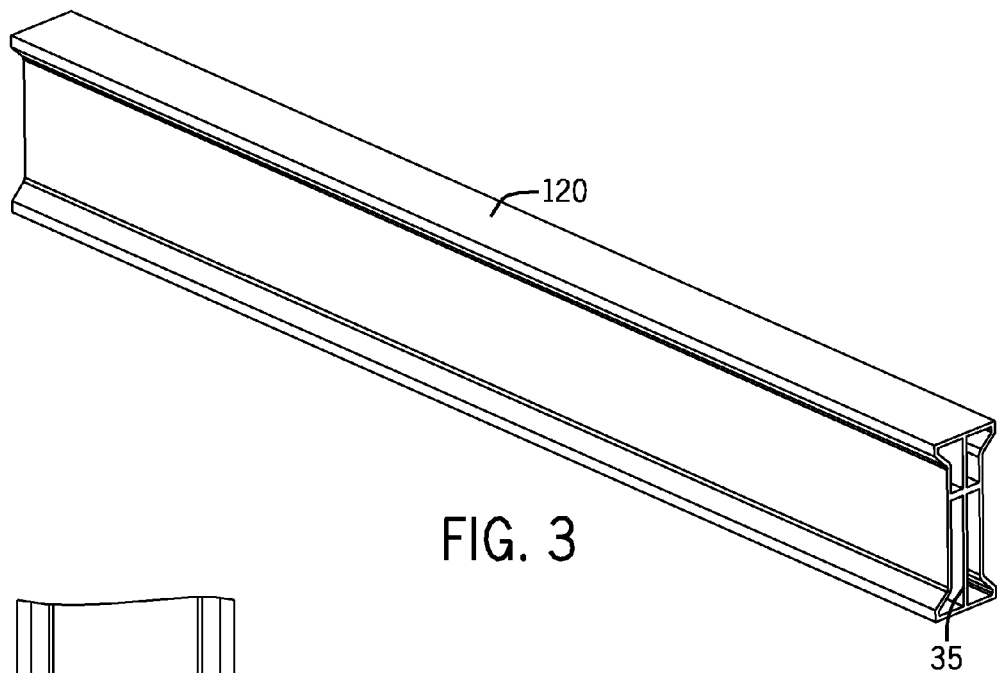
FIG. 3 is a perspective view of the frame of the inventive level showing inner walls.
Figure 4:
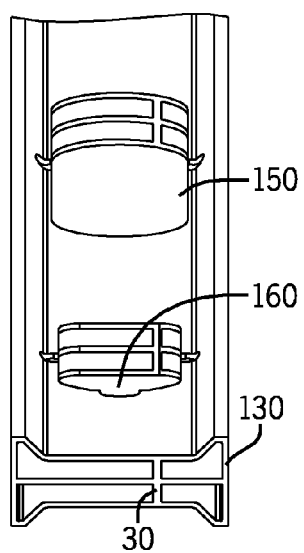
FIG. 4 is a fragmentary perspective end view of the frame of the level of FIG. 3 showing material removal for central-vial top notch and hand-hold holes.

In inventive box level 100, level frame 120 includes an internal horizontal wall 30. As seen in FIGS. 3 and 4, such internal horizontal wall 30 is substantially parallel to top wall 130 and is spaced from top wall 130 for a distance 31 necessary for installation of a central vial 50. FIG. 4 shows that this internal horizontal wall 30 is entirely removed in portions of level frame 120 to form hand-holes 150 and in areas 160 for installation of end vials such as plumb vials 40.

Because of its specific location along bottom 21 of central-vial notch 20, internal horizontal wall 30 significantly strengthens the central region 170 of frame 120 which has been weakened by the material removal.

FIGS. 3 and 4 further show that frame 120 of inventive box level 100 further includes an internal vertical wall 35. Such vertical internal wall 35 adds rigidity to entire frame 120 and strengthens areas with material removal and where horizontal wall 30 is not present, including around hand holes 150 and plumb-vial holes 160, as seen in FIG. 4.

Figure 5:
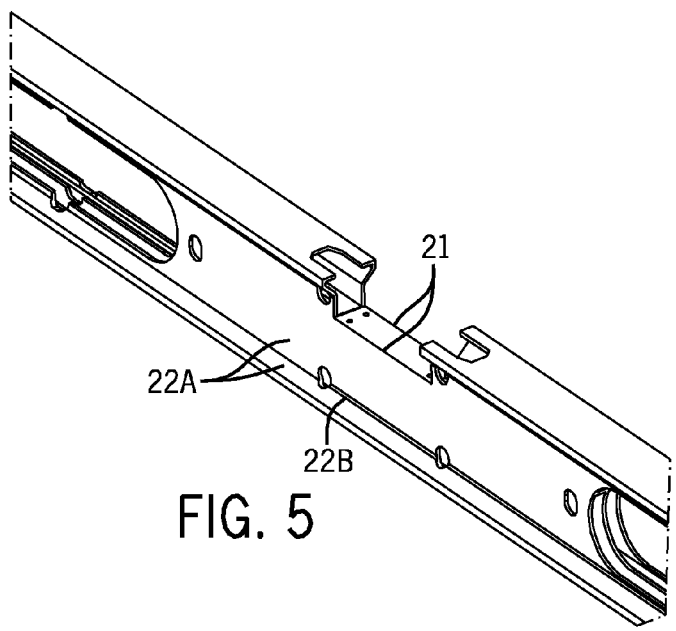
FIG. 5 is a fragmentary perspective side view of the level frame of FIG. 5, showing strengthening of the weak regions around material removal.

FIG. 5 shows that in inventive box level 100 the weakness of the central-vial notch region 20 is reduced to much lesser degree, i.e., to green in previously notch-bottom red areas 21, light blue in previously green areas 22A and to no weakness in previously light blue areas 22B. In fact, a table of FIG. 6, which includes data from finite element analysis of prior-level frame 12 and the improved frame 120 of level 100 of this invention, shows that the improved frame 120 is 180% stronger then prior frame 12 without the internal horizontal and vertical walls 30 and 35.

As seen in FIGS. 3 and 4, internal horizontal and vertical walls 30 and 35 form a quad-box structure of a superior strength. It should be noted that during manufacturing of the inventive level 100, the thickness of the frame-forming walls has been reduced. Surprisingly, despite such thinning of the walls, the strength of the frame increased. This was partially explained by decrease in the overall weight of the frame 120 which resulted in static improvement and the frame impact performance. In addition to the improved level performance characteristics, such thinning of the walls provides reduction in material used which translates in lower product cost.

It is also important to note that specific positioning of the internal horizontal wall 30 at bottom 21 of central-vial notch 20 is important for achieving such improved strength.

Figures 6, 7:
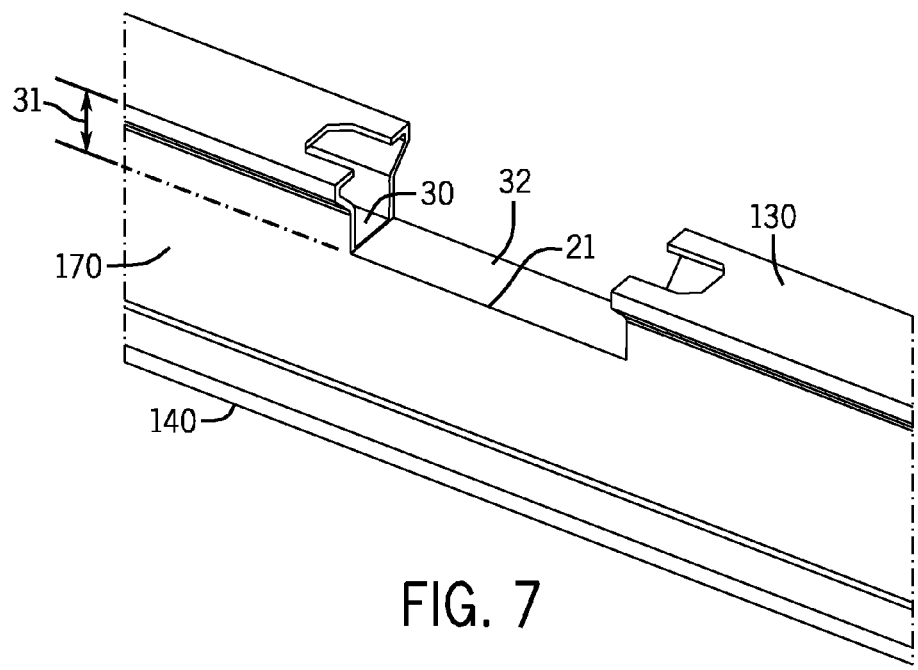
FIG. 6 is a comparison table reflecting test results showing increase in frame strength in the inventive level frame of FIG. 5.
FIG. 7 is a fragmentary perspective view of the inventive level frame showing precisely parallel surfaces for a calibration-free installation of the central vial.
Figure 8:
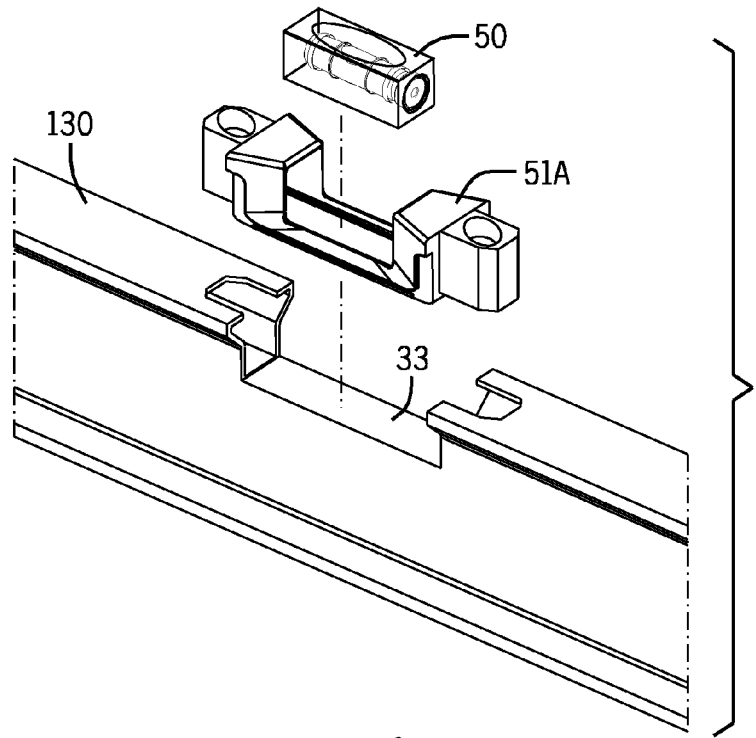
FIG. 8 is an exploded fragmentary perspective view showing one version of the calibration-free installation of the central vial to the level frame of FIG. 7.
Figure 9:
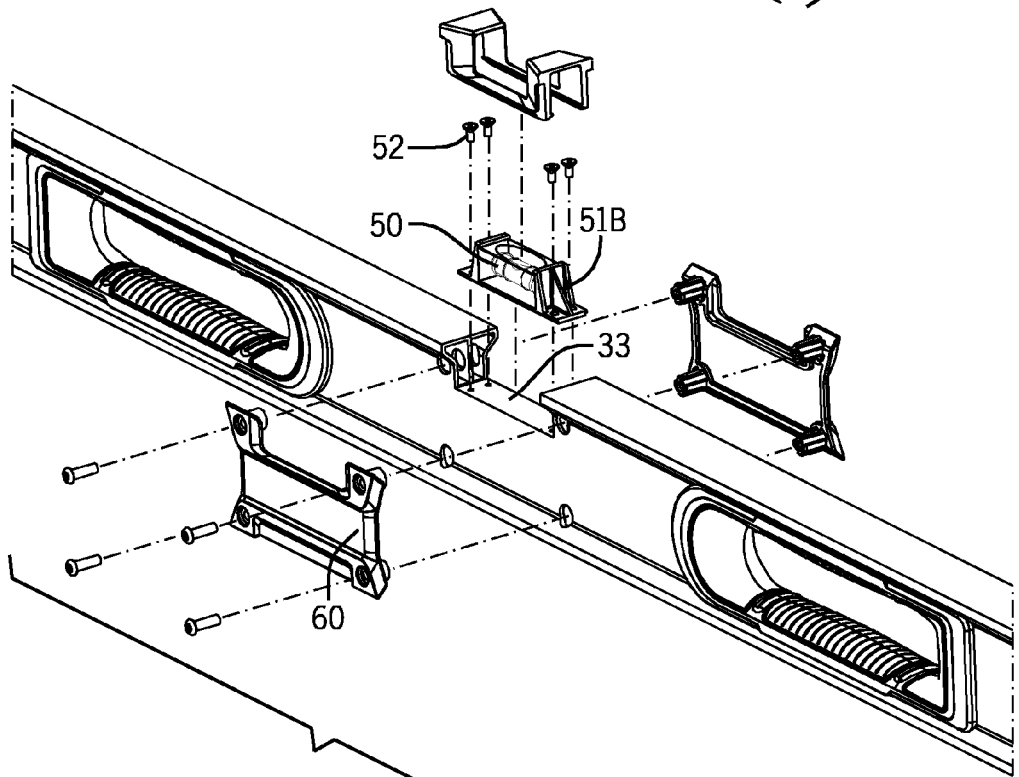
FIGS. 9-12 are exploded fragmentary perspective views of the inventive box level showing different stages of calibration-free installation of the central vial and exterior strengthening of the central region of the level frame.
Figure 10:
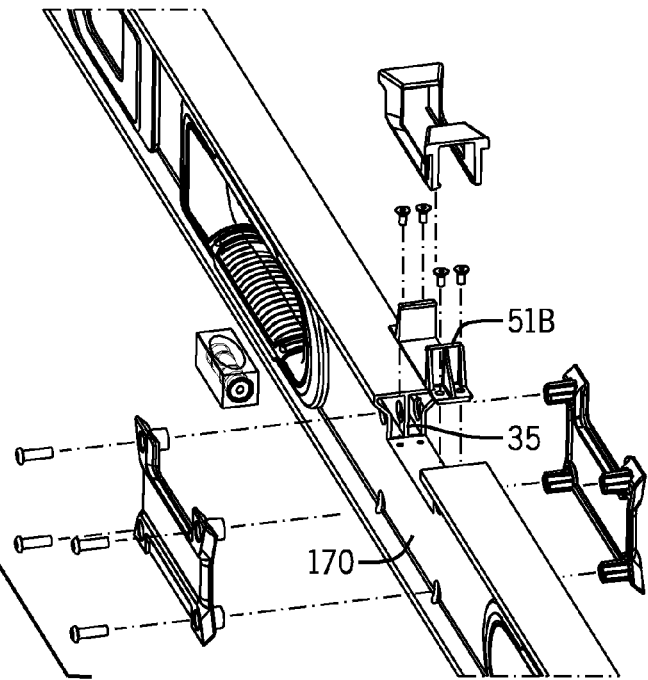
Figure 11:
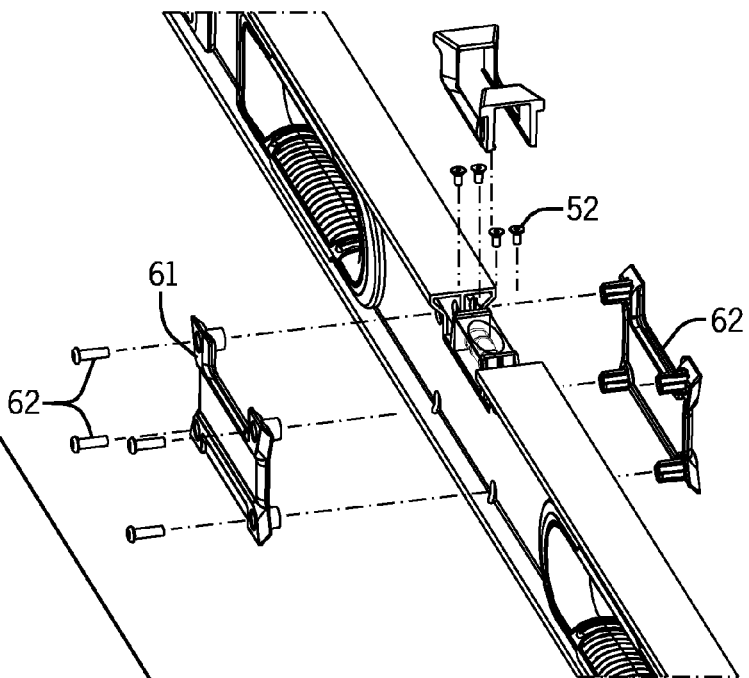
Figure 12:
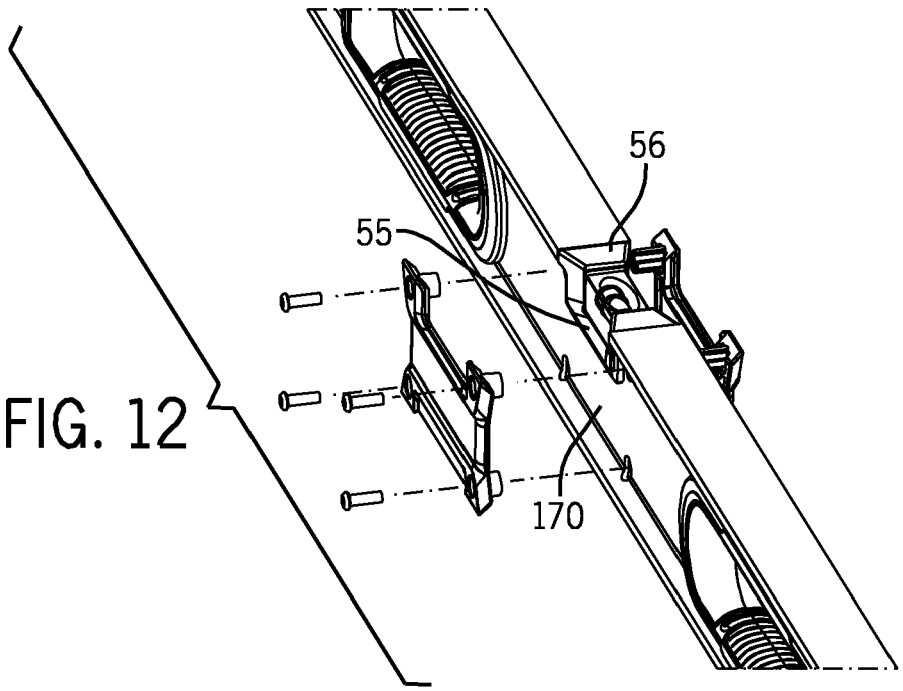
Figure 13:
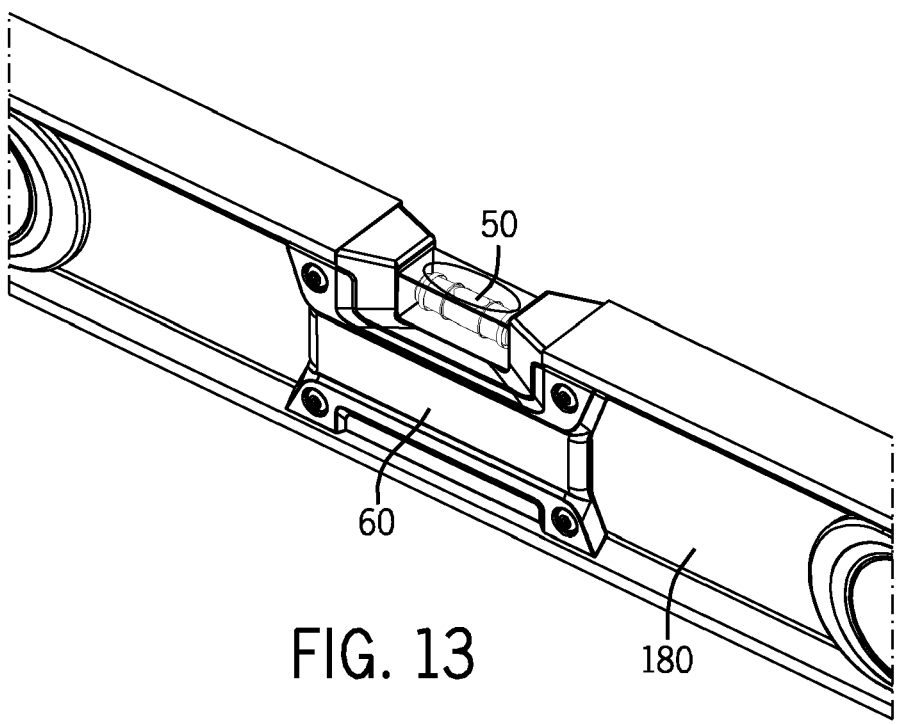
FIGS. 13 and 15 are fragmentary perspective views of the central region of the inventive level assembled as shown in FIGS. 9-12.
Figure 14:
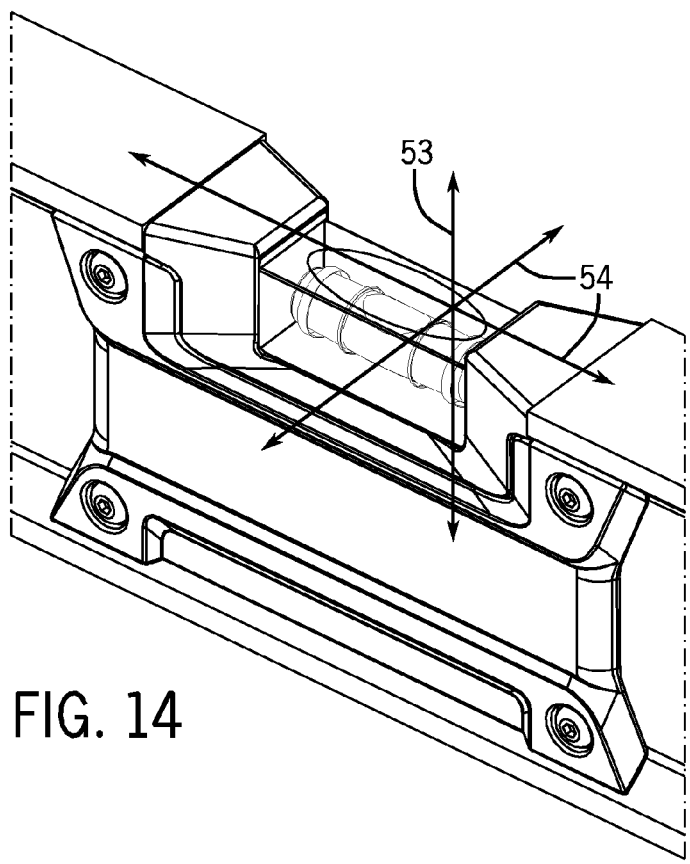
FIG. 14 is a fragmentary perspective view of the central region of the inventive level and showing precise calibration-free installation of the central vial.
Figure 15:
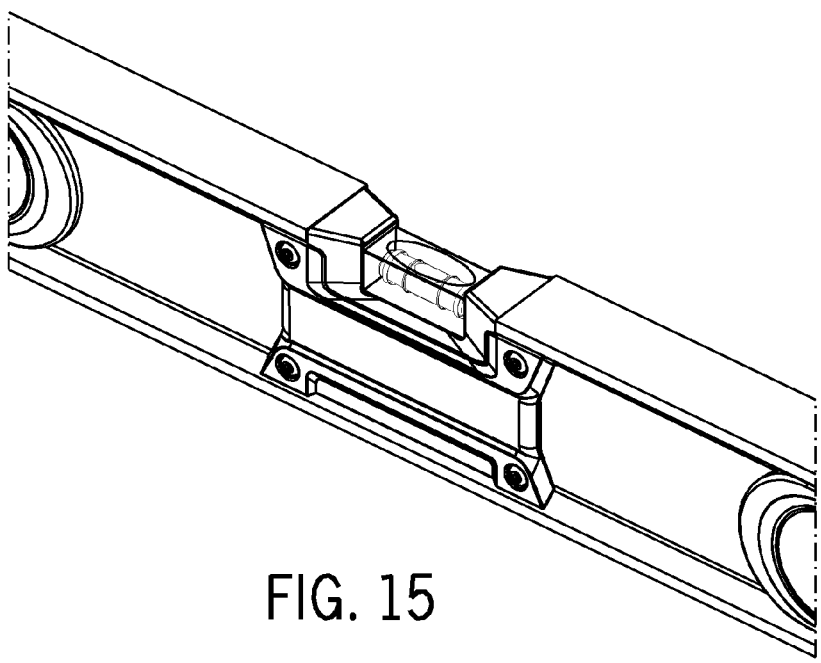
Figure 16:
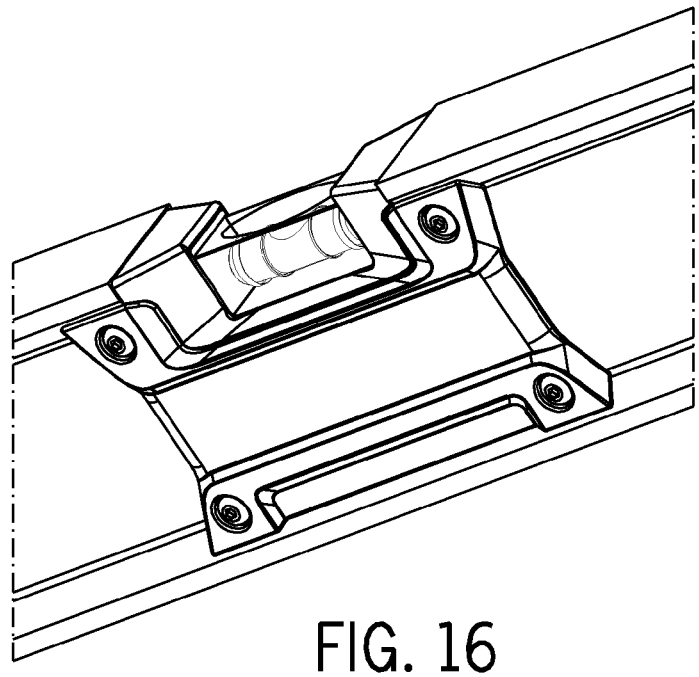
FIG. 16 is a fragmentary perspective view of the central region of the inventive level of FIG. 15 in more detail.

Another important aspect of the present invention is that such positioned internal horizontal wall 30 serves for accurate secure installation of the central vial 50. During manufacturing of the level frame 120, top and bottom measuring walls 130 and 140 and an upper surface 32 of internal horizontal wall 30 within central-vial notch 20 all simultaneously undergo a milling by a computer-numerical control machine (CNC). The CNC milling during a single operation ensures that all three surfaces are parallel to each other. Thus, upper surface 32 of internal horizontal wall 30 is parallel to top and bottom measuring walls 130 and 140, as seen in FIG. 7.

Such accurately machined upper surface 32 of the internal horizontal wall 30 forms a reference shelf 33 for precise installation of central vial 50 along vertical axis 53. As shown in FIGS. 8-11, vial 50 is placed in a cradle 51 and mechanically mounted to upper surface 32 of reference shelf 33 with mechanical fasteners such as screws 52.

Because of the accuracy in machining of reference shelf 33, there is no need for manual calibration or adjustment in the positioning of central vial 50 with respect to measuring surfaces 130 and 140. Such advance in the central-vial installation provides great improvement in manufacturing processes by substantially reducing manual labor. In prior levels, each vial was secured to frame 12 by using an epoxy-based locking system. Each such vial was individually calibrated and only then permanently secured to frame 12. A number of problems is associated with such prior method of vial installation. One is that the need for calibration of the vial prior to permanent securement involves manual labor which increases costs for manufacturing and requires special quality-control procedures. Another problem is that over time due to variations in temperature or humidity adhesives tend to change its characteristics which may contribute to changes in positioning of the vial as well as in weakening of the vial attachment to the frame. In inventive level 100, vial 50 is accurately secured to frame 120 without any glue, but only with mechanical fastening against precisely machined reference surface 33 which does not change overtime.

Such mechanical securement of central vial 50 also involves an external brace 60 which is secured over central region 170 of level frame 120, as seen in FIGS. 9-15. External brace 60 includes two plates 61 each of which spans the entire surface of the respective vertical side wall 180. External brace CO is preferably made from cast aluminum and is mechanically secured to the frame with screws 62 which extend through apertures 63 in sidewalls 180 and internal vertical wall 35.

Such external brace 60 completes mechanical fastening of the central vial 50 to frame 120 by an additional fixing of vial 50 in a horizontal plane 54. As best seen in FIGS. 12-16, brace sandwiches a flange 55 of a vial frame 56 such that vial 50 is securely held in front-to-back, up-and-down and left-to-right directions.

Figure 2:
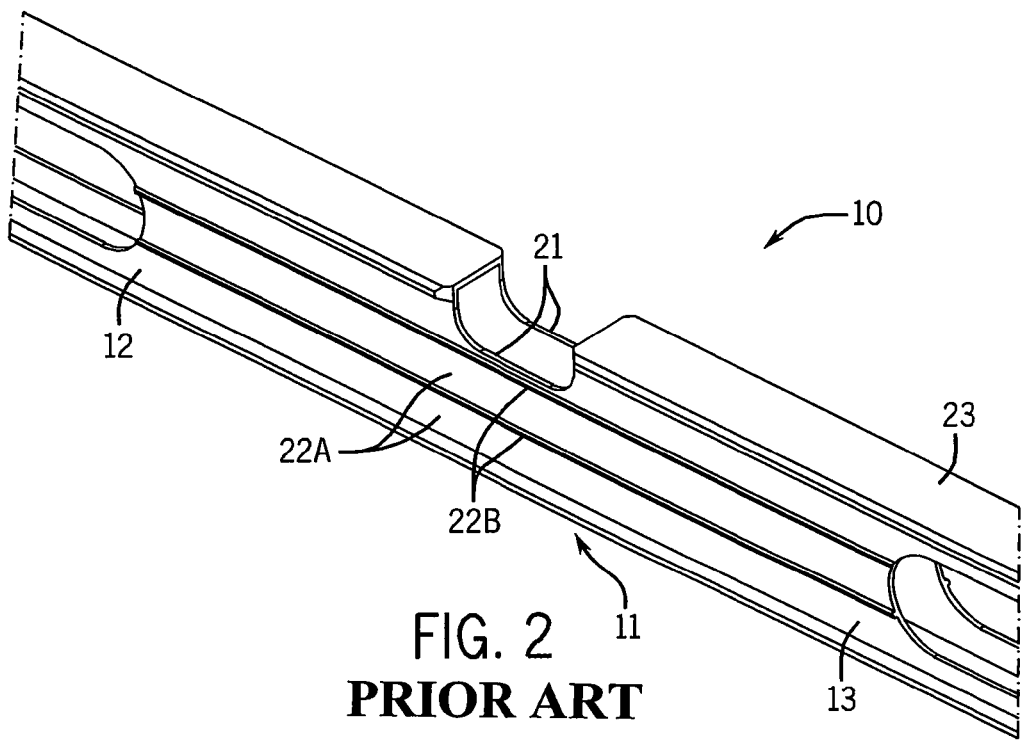
FIG. 2 is a fragmentary perspective view of a prior level frame showing weak regions around material removal for central-vial top notch and hand-hold holes.
Figure 17:
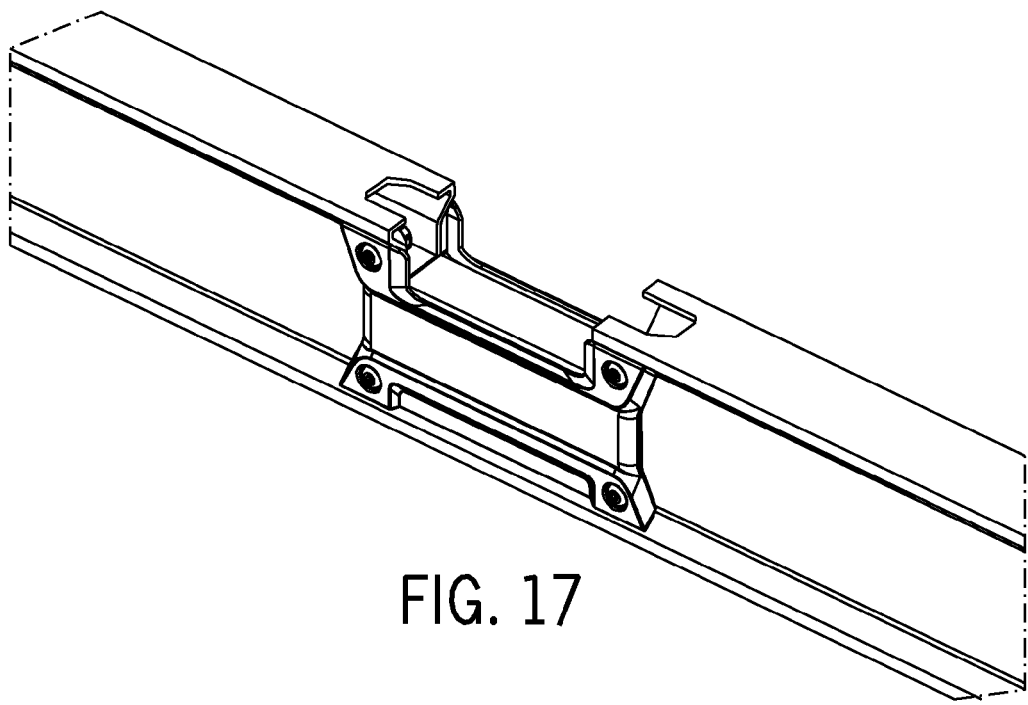
FIG. 17 is a fragmentary perspective view of the central region of partially-assembled inventive level showing strengthening by the external reinforcement of the central region.

Furthermore, external brace 60 provides an additional reinforcement of central region 170. In fact, the sandwiching of the central region by external brace 60 substantially eliminates the weakness in that area. Indeed, FIG. 17 illustrates that tests showed that previously weakest (red) areas in bottom 21 of notch 20, as seen in FIG. 2 showing prior level 10, are just slightly weakened (light blue) in improved level 100 which includes external brace 60. The areas, which in prior level 10 were substantially weak (green) or weakened (light blue), in improved level 100 (seen in FIG. 17) exhibit similar strength as the strongest areas of frame 120 where no material removal occurred.

Moreover, the table of FIG. 18, which includes data from testing of prior level 10 and improved level 100, shows that improved level 100 is 300% stronger then prior level 10.

The manufacturing of the improved inventive level 100 also includes CNC milling of openings 160 for plumb vials 40. While entirely removing internal horizontal wall 30 in regions 160 of frame 120, such CNC milling forms precise positioning references 36 in internal vertical wall 35 for installation of plumb vials 40, as seen in FIGS. 19 and 20A. This process allows for adhesive-free installation of plumb vials and ensures precise positioning when the vials are secured within frame 120 without any calibration or adjustment required. This is a great improvement over manufacturing of many prior box levels which required calibration and adjustment of plumb vials. This process further eliminates quality and longevity concerns associated with the use of adhesive, as already discussed above. Vials installed within frame 120 according to the inventive method will remain in their precise position for accurate reading over time.

Figure 20B:
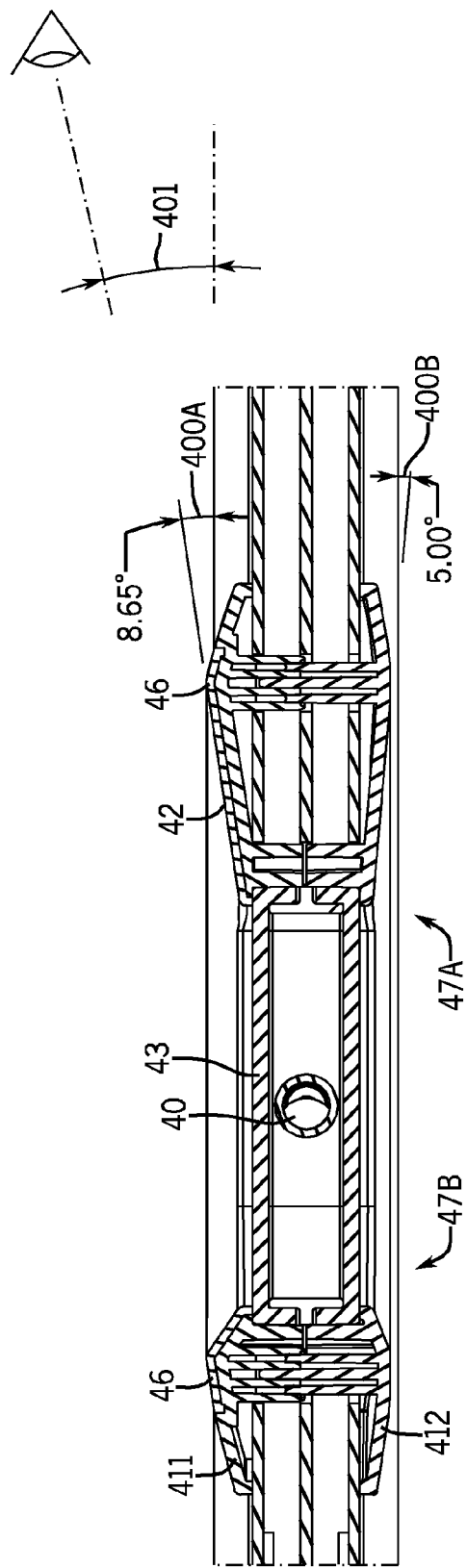
FIG. 20B is cross-sectional view of the inventive plumb-vial assembly along a horizontal section plane.

FIGS. 20, 20A and 20B show that, in inventive box level 100, plumb vials 40 are encased in a plumb-vial structure 41 made of a high-quality and durability Xenoy* alloy which is a blend of semi-crystalline polyester (typically polybutylene terephthalate, PBT, or polyethylene terephthalate, PET) and polycarbonate (PC). The Xenoy* alloy offers great impact resistance even at low temperatures, heat resistance, and outstanding aesthetic characteristics. Xenoy alloys further offer outstanding performance in applications that are exposed to harsh conditions, or that require a high degree of toughness such as applications for professional-construction levels. Furthermore, Xenoy iQ* resins are created with polybutylene terephthalate (PBT)-based polymers derived from 85% post-consumer plastic waste, consuming less energy and yielding less carbon dioxide ($CO_2$) in their manufacturing than traditional resins. It is seen that the use of Xenoy* alloys present many advantages over standard acrylics often used in plumb-vial casings.

Figure 21:
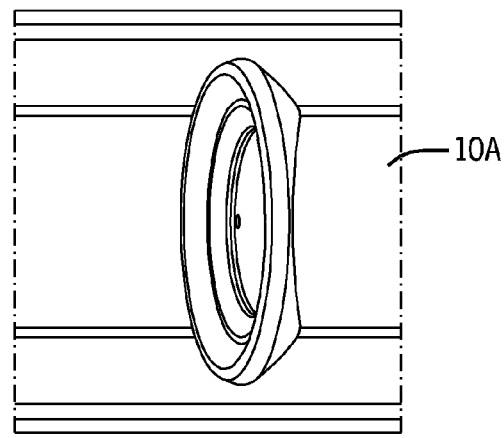
FIGS. 21 and 22 are fragmentary perspective views of the inventive level and illustrating high-visibility plumb vial aspect of the present invention.
Figure 22:
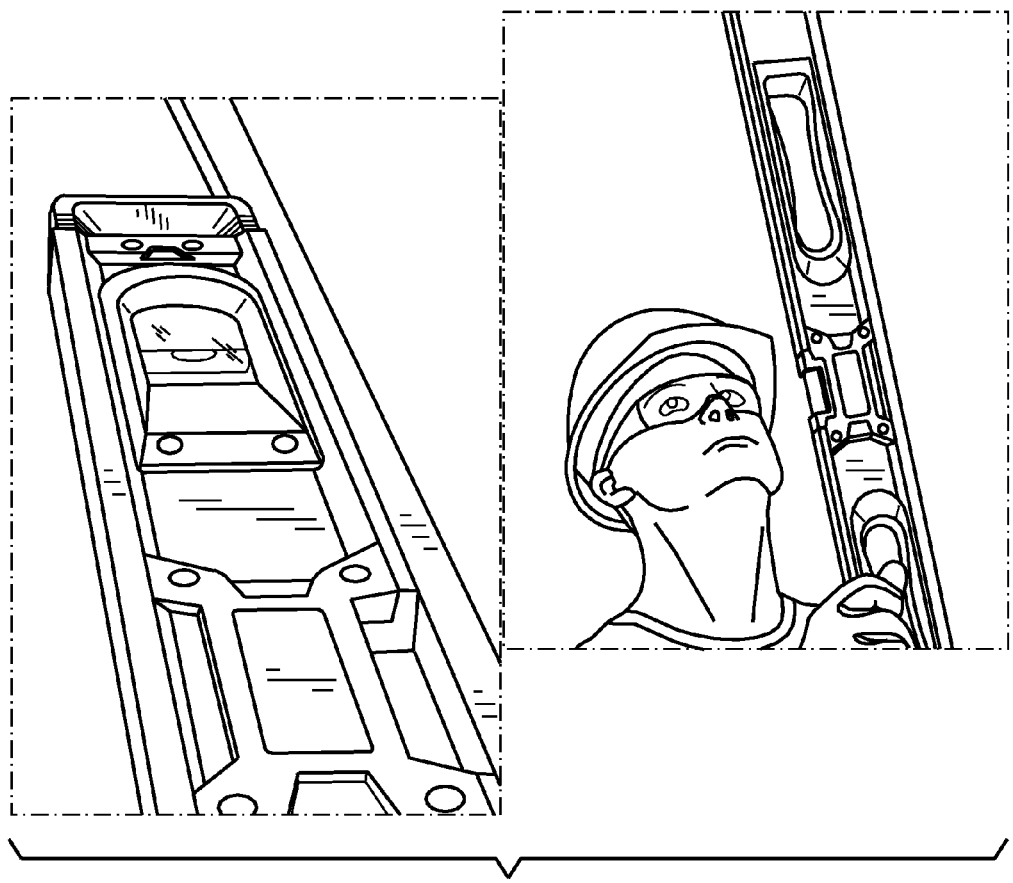

In levels of substantial lengths such as forty-eight inches and greater, plumb vials are positioned at substantial distance from user's eyes. FIG. 21 shows how in some prior levels plumb-vial mounting structures may block the view for reading of the plumb vial.

FIGS. 19-23 illustrate another aspect of the present invention which provides improved visibility of plumb vial 40. Such improved visibility is achieved by an inventive configuration of plumb-vial mounting structure 41 includes an elongate inclined ramp 42 sloping from about the side-wall surface at a reduced angle toward a plumb-vial window 43. Plumb-vial structure 41 has a viewing-end region 47A and an opposite-end region 47B, the viewing-end region 47A including elongate ramp 42 sloping along a level-longitudinal axis 101 toward plumb vial 40 with an inclination angle 400 permitting vial viewing from shallow angles 401. Such reduced angle 400 of inclination facilitates user's viewing of plumb vial 40 from about central region 170 of level 100 or even from farther distance, as' seen in FIG. 30. FIG. 20B best shows angle 400 being 8.65° and as little as 5°. Vial opening 43 also has an elongate configuration of an inner portion 44 on the side of the level central region 170. Such elongation allows spacing of vial 40 away from ramp 42. As further seen in FIGS. 22 and 30, such spacing in cooperation with elongate inclined ramp 42 compensates for the extended viewing distance and provides improved visibility of vial 40 for the necessary measurement readings.

The term "shallow," as referred to the viewing angle 401, means that such angle is closer to the 0° plane (of the major level sidewall surface) than to the 90° plane (perpendicular to the level sidewalls). Angles 401 are preferably slightly above sidewall surfaces such that the vial becomes visible at a little over angle 400 of sloping ramp 42 shown in FIGS. 20B and 32.

Plumb-vial window 43 includes lenses 48 made of "bullet proof" Lexan* material. Such lenses provide further durability and impact resistance of improved level 100.

Figure 24:
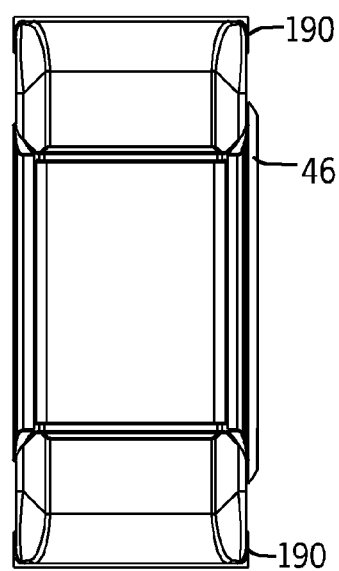
FIG. 24 is an end view of the inventive level, showing a gripping extension of the plumb-vial assembly.

FIGS. 20A and 20B show that plumb-vial structure 41 includes first and second side portions 411 and 412. Each side portion 411 and 412 is positioned along one of level sidewalls 180. First side portion 411 includes a high-friction region 46 extending from first side portion 411 outwardly beyond an outmost sidewall portion 190, as best seen in FIG. 24, for gripping a work surface. High-friction region 46 is preferably made of rubber molded over the Xenoy* alloy. Rubber portions 46 extend beyond the outmost vertical side surface 190 of that side of level 100 to allow gripping of a work surface against which level 100 is positioned for measurements.

Figure 23:
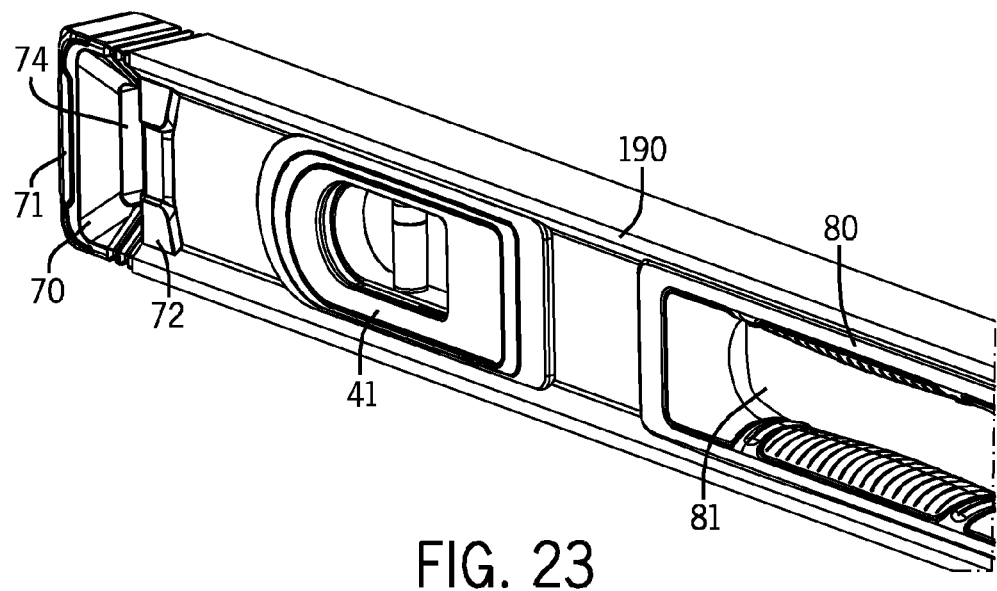
FIG. 23 is a detailed fragmentary perspective view of the end-vial region of the inventive level showing an improved-visibility plumb vial and an improved end cap.
Figure 25:
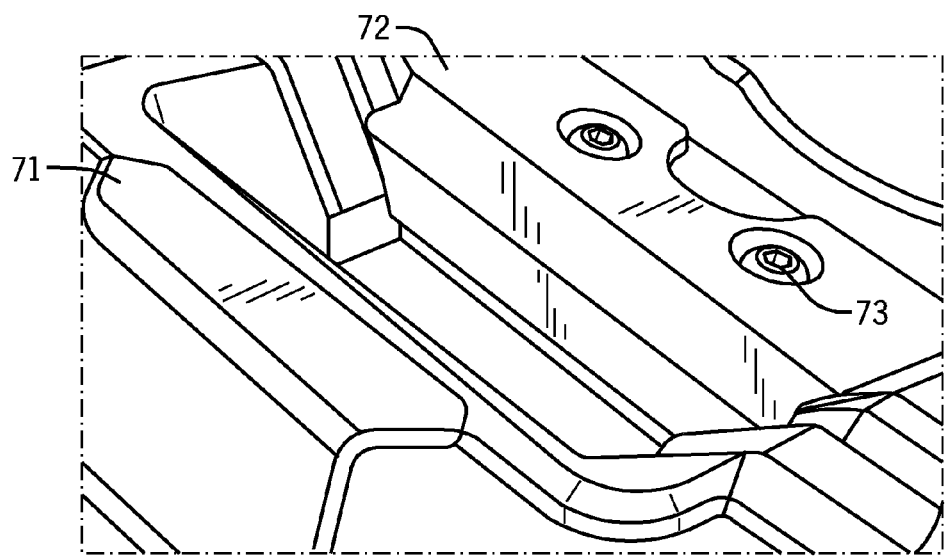
FIG. 25 is a fragmentary perspective view showing details of the improved end cap.
Figure 26:
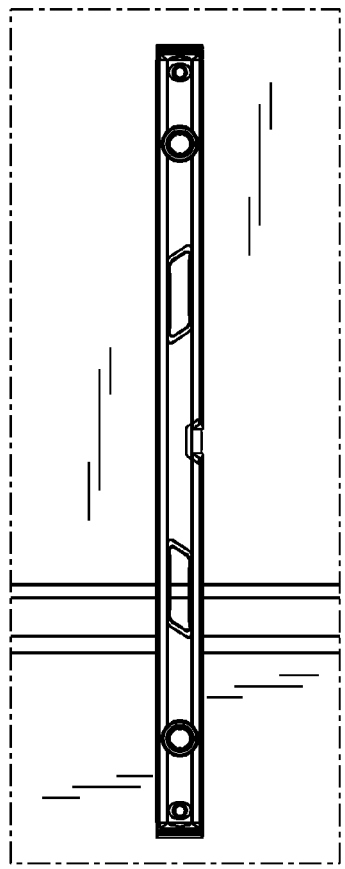
FIG. 26 is a front perspective views of the inventive level shown in resting position against a vertical surface.
Figure 27:
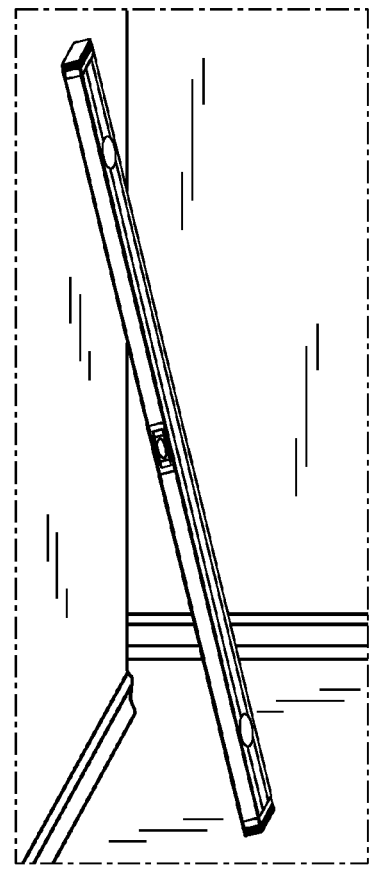
FIG. 27 is a side perspective views of the inventive level shown in resting position against a vertical surface.

FIG. 23 further shows an improved end cap 70 which is made with an ABS material on the inside and an outside rubber coating over the ABS material. The rubber coating provides an improved shock absorption even if the level 100 is dropped from a substantial height. As seen in FIGS. 23 and 25, outside rubber coating of end cap 70 includes a slightly raised section 71. While raised section 71 does not extend beyond the outmost vertical side surface 190 of that side of level 100, such raised rubber section 71 facilitates gripping of a vertical surface against which level 100 may be leaned against during a break between jobs, as seen in FIGS. 26 and 27.

As further seen in FIG. 25, end cap 70 is held to frame 120 with two cast aluminum mounting plates 72 which are mechanically secured to frame 120 with screws 73. Such secure screw attachment also permits end caps 70 to be removed by simple disengagement of screws 73. While the removal of end caps 70 requires use of additional tools such as screw driver, when necessary, this removable end-cap assembly accommodates precise marking of the work surface even along corners. Each end cap 70 also has an enlarged hang hole 74 which allows for quick hanging of level 100 on the job site.

Figure 28:
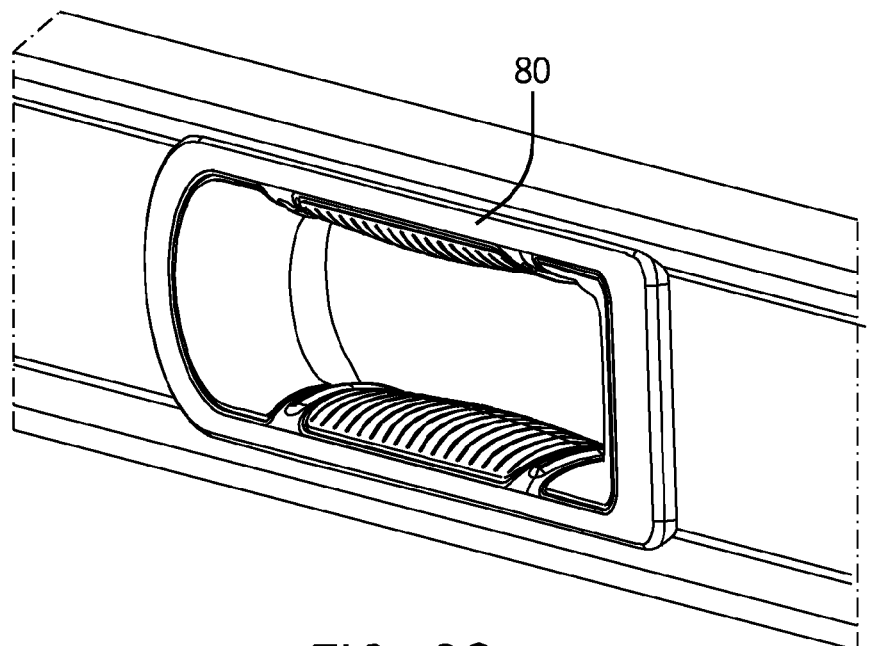
FIGS. 28 and 29 are fragmentary perspective views showing an improved hand grip of the inventive level.
Figure 29:
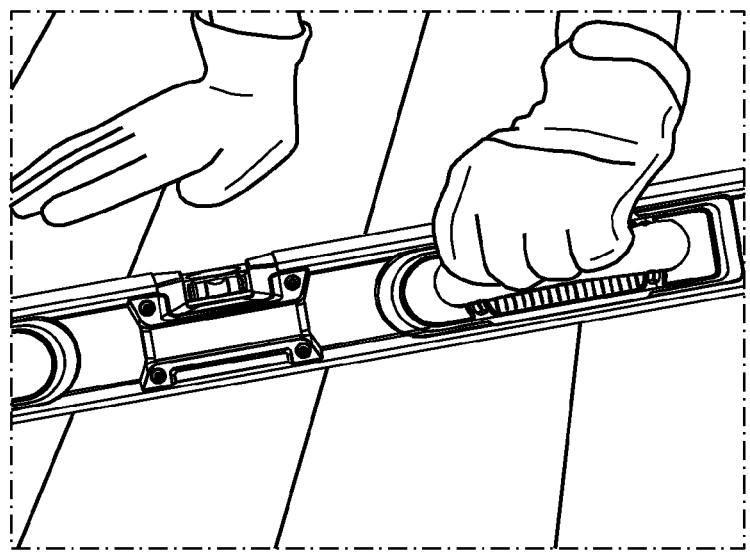
Figure 30:
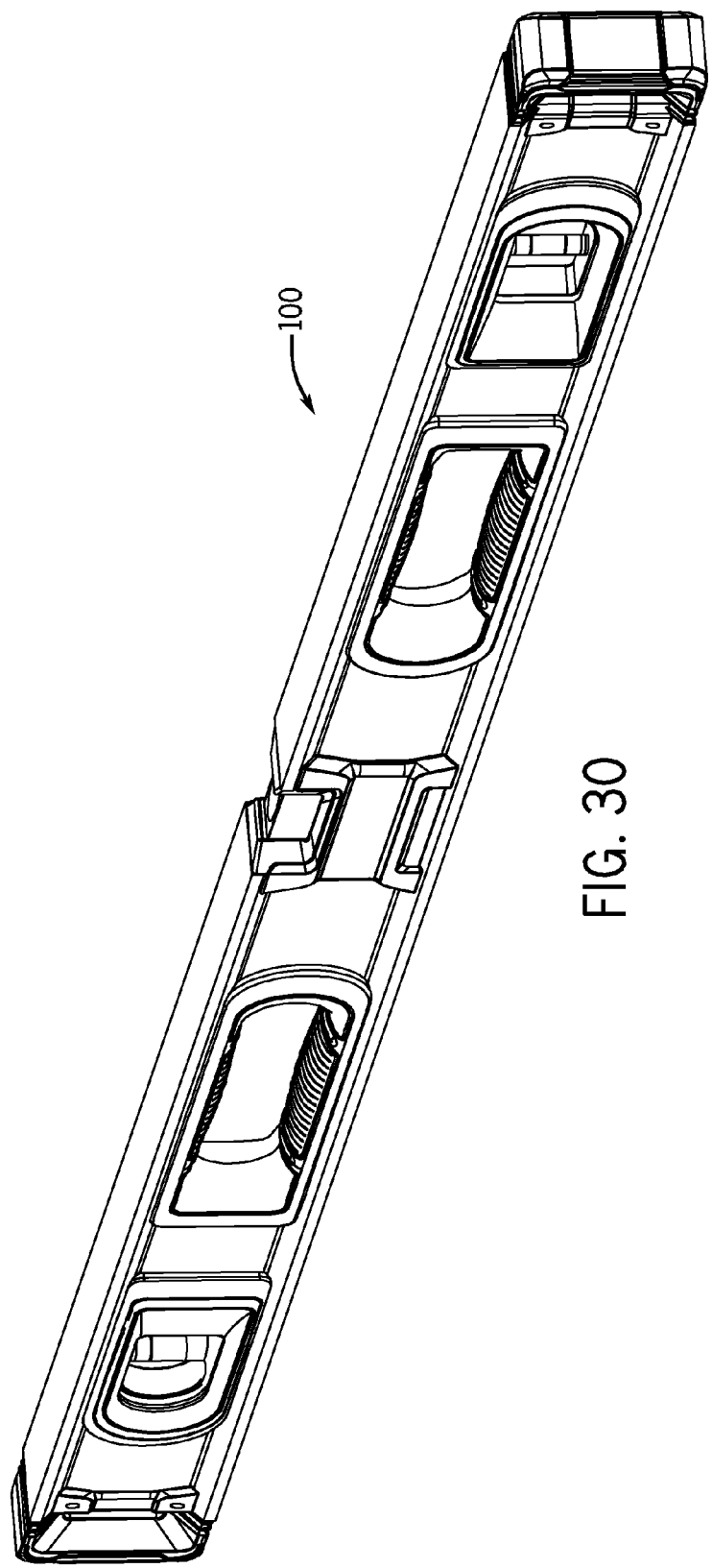
FIG. 30 is a perspective view of the inventive level.

As with the plumb-vial casing, a hand grip 80 seen in FIG. 28 is also made from Xenoy iQ* alloy which is a material used in car bumpers and is very strong in all temperatures, chemical resistant and UV stable. As seen in FIG. 29, hand grips 80 are made with an enlarged hole 81 to accommodate gloved hands and to reduce fatigue.

The invention claimed is:

1. A level comprising:
    an elongate hollow frame having an interior defined by first and second sidewalls and top and bottom walls each extending between the sidewalls;
    a central vial within a topnotch which is formed by removal of a topwall section and adjacent sections of each sidewall including notch-defining bottom and side edges;
    a frame-reinforcing external brace substantially spanning the distance between the top and bottom walls about the topnotch and including first and second plate members each against one of the sidewalls about the notch-defining bottom and side edges and each substantially spanning a respective one of the sidewalls, a fastening member extending through the sidewalls and pulling the plate members toward each other to sandwich the sidewalls therebetween, thereby reinforcing a central frame portion weakened by the removal of the topwall section forming the topnotch.

2. The level of claim 1 wherein:
    each sidewall includes top and bottom outmost wall-portions joined with a recessed major wall-portion by top and bottom inclined wall-portions; and
    the external brace includes top and bottom ends each positioned against a respective one of the inclined wall-portions such that the brace is substantially recessed with respect to the outmost wall-portions.

3. The level of claim 1 wherein the fastening member secures the plate members through the sidewalls with threaded fasteners extending through apertures in the first plate member and engaging aligned threaded channels protruding inwardly from the second plate member.

4. The level of claim 1 wherein the hollow frame is an extrusion including an inner horizontal wall extending between the sidewalls at the notch-defining bottom edges thereby reinforcing the frame weakened by the removal of the topwall section.

5. The level of claim 1 wherein the hollow frame is a one-piece extrusion which includes an integral inner vertical wall between the top and bottom walls and reinforcing the frame along the frame length, the fastening member extending through the internal vertical wall thereby further reinforcing the weakened central frame portion.

6. A method for manufacturing a reinforced level, the steps comprising:
    providing an elongate hollow frame with an interior defined by two sidewalls and top and bottom walls each between the sidewalls;
    forming a central-vial receiving topnotch by removing a topwall section and adjacent sections of sidewalls including notch-defining bottom and side edges;
    providing a frame-reinforcing external brace configured to substantially span the distance between the top and bottom walls about the topnotch and including a pair of plate members each configured to substantially span one of the sidewalls about the notch-defining edges;
    positioning each plate member against a respective one of the sidewalls about the notch-defining edges; and
    securing the external brace to the frame with a fastening member extending through the sidewalls and pulling the plate members toward each other to sandwich the sidewalls therebetween, thereby reinforcing a central frame portion weakened by the removal of the topwall section to form the topnotch.

7. The method of claim 6 wherein the hollow frame is an extrusion with an inner horizontal wall being integral with the sidewalls thereby reinforcing the frame weakened by the removal of the topwall section to form the topnotch.

8. The method of claim 6 wherein the hollow frame is a one-piece extrusion which includes an integral inner vertical wall extending between the top and bottom walls thereby reinforcing the frame along the frame length.

9. The method of claim 8 wherein, in the securing step, the fastening member extends through the internal vertical wall thereby further reinforcing the weakened central frame portion.

\* \* \* \* \*